(12) United States Patent
Doi

(10) Patent No.: US 7,553,029 B2
(45) Date of Patent: Jun. 30, 2009

(54) STRUCTURE OF PROJECTOR ENGINE SECTION

(75) Inventor: Naohito Doi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 464 days.

(21) Appl. No.: 11/375,641

(22) Filed: Mar. 14, 2006

(65) Prior Publication Data

US 2006/0215125 A1    Sep. 28, 2006

(30) Foreign Application Priority Data

Mar. 14, 2005  (JP)  ............................. P2005-070299

(51) Int. Cl.
G03B 21/18 (2006.01)
G02F 1/00 (2006.01)
H01S 3/04 (2006.01)
H05K 7/20 (2006.01)

(52) U.S. Cl. ........................... 353/56; 353/122; 372/36; 348/771; 361/709

(58) Field of Classification Search .................... 353/52, 353/56, 122; 372/36; 348/771; 361/709
See application file for complete search history.

(56) References Cited

U.S. PATENT DOCUMENTS 5,175,613 A * 12/1992 Barker et al. ................. 257/713
6,730,993 B1 * 5/2004 Boyer et al. ................. 257/675
2006/0146499 A1 * 7/2006 Reents ........................ 361/704
2006/0227514 A1 * 10/2006 Kang, III et al. ............ 361/719

FOREIGN PATENT DOCUMENTS

| JP | 9-232785 | 9/1997 |
| JP | 2003-17865 | 1/2003 |
| JP | 2004-205714 | 7/2004 |

OTHER PUBLICATIONS

Patent Abstract from "*espacenet* database—Worldwide", Application No. 2004-205714, dated Jul. 22, 2004 (1 page).
Patent Abstracts from "*espacenet* database—Worldwide", Application No. 9-232785, dated Sep. 5, 1997 (1 page).
Patent Abstract from "*espacenet* database—Worldwide", Application No. 2003-17865, dated Jan. 17, 2003 (1 page).

* cited by examiner

*Primary Examiner*—Diane I Lee
*Assistant Examiner*—Magda Cruz
(74) *Attorney, Agent, or Firm*—Jonathan P. Osha

(57) ABSTRACT

A structure of a projector engine section includes: an engine section that projects through a projector lens an optical image formed by modulating a light flux depending on image information; a circuit board that has a digital mirror device control circuit and attached to the engine section; a heat sink that faces the circuit board so as to prevent a heat generation due to the fullness of heat in the engine section; and a gasket plate that is made of a sheet metal and is inserted into the space between the circuit board and the heat sink, such that the gasket plate elastically contacts with a ground pattern of the circuit board and the heat sink.

6 Claims, 7 Drawing Sheets

STRUCTURE OF PROJECTOR ENGINE SECTION

BACKGROUND

1. Field

The present invention relates to a structure of an engine of a projector used in projecting an image on a screen in various kinds of presentation and at home.

2. Description of the Related Art

A related art is disclosed, in which an engine of a projector used for presentations is formed by an optical unit, the optical unit modulates a light flux ejected from a light source device according to image information so as to form an optical image, a projected image is formed on a screen through a projector lens, and when a casing is made of synthetic resin in a projector, a light source driving circuit needs an electronic shielding member to become an EMI (electromagnetic interference) generating source (refer to JP-A-2004-205714). Further, a method in which a shield plate shielding the EMI generating source is attached to a cover member for the exchange of the light source lamp by an attaching screw so as to prevent a detachment of the shield plate is described in the document JP-A-2004-205714.

In another related art, in order to shield electromagnetic waves, which are radiated from a flat cables which connect the drive circuit block of a liquid crystal projector with a liquid crystal panel, a metal sheet is formed by punching holes in an aluminum thin film or the like by a metal mold, and the metal sheet is inserted into an opening of a shield case and fixed by threading in an attaching hole of a drive circuit block (refer to JP-A-9-232785).

In another related art, a shield member made of metal sheet is accommodated in an outer case made of resin of a projector (refer to JP-A-2003-017865).

FIG. 4 is a side view schematically showing an external constitution of the projector engine section which corresponds to a projector engine section described in the document JP-A-2004-205714, and FIG. 5 shows a casing frame 1, a circuit board 3 and a heat sink 4 of the engine section.

As shown in FIG. 4, a cover 2 made of sheet metal disposed in an upper portion of the casing frame 1 constitutes a hollow housing, various kinds of optical parts are built in the housing. A projector lens 12 is provided in front of the housing, and the circuit board 3 having a digital mirror device control circuit attached thereon and the heat sink 4 are disposed in this order behind the housing. An engine section 100 functions as an optical unit, that is, exerts in projecting an optical image formed by modulating light flux according to image information through a projector lens. In this respect, to prevent deterioration of video restoring performance due to a leakage of light from the engine section, the casing frame 1 or the cover 2 also prevents the light from leaking by sealing the engine section 100. At the same time, the heat sink 4 dissipates the heat generated in the sealed engine section 100 so as to prevent a heat generation due to the fullness of heat in the engine section 100. In the meantime, as shown in FIG. 5, an upper portion of the casing frame 1 is open, a mouth edge portion 14 of an aperture 13 thereof is provided with a projection 15 and a screw hole 16 on the right and left side. The cover 2 shown in FIG. 4 is attached on the mouth edge portion 14 of the aperture 13 by using the projection 15 and the screw hole 16.

It is assured that electromagnetic interference (EMI) is generated as electromagnetic noise coming from the circuit board 3 is radiated through a fin of the heat sink 4, in the engine section 100 having the above-described structure. Accordingly, measures (EMI-prevention) have been taken to prevent the electromagnetic interference.

FIG. 6 is a cross-sectional view showing a conventional EMI-prevention. FIG. 7 is a perspective view schematically showing a rod-shaped gasket 5 used for an EMI-prevention.

The rode-shaped gasket 5 of FIG. 7 used in the conventional EMI-prevention is formed by wrapping and insulating a core 51 having elasticity with a mesh material (metallic mesh) 52 having conductivity and flexibility. In the EMI-prevention, as the rod-shaped gasket 5 is inserted into a space between the circuit board 3 and the heat sink 4 opposite to each other, the rod-shaped gasket 5 is held in the space by the elasticity of the rod-shaped gasket 5. Measures has been taken in which the rod-shaped gasket 5 is attached to the circuit board 3 and the heat sink 4 by using Double-sided adhesive tape. In addition, as shown in FIG. 6, the tip of the cover 2 is superimposed on the mouth edge portion 14 of the casing frame 1 so as to combined with the casing frame 1 by the attaching screw 17 that is screwed into a screw hole 16 of the mouth edge portion 14.

However, according to the conventional EMI-prevention described with reference to FIG. 6, it is known that an impact applied on the engine section 100 during assembly processing or vibrations that can occur in other circumstances can cause the rod-shaped gasket 5, serving as the EMI-prevention, inserted into the space between the circuit board 3 and the head sink 4 to be dislocated or fall off the space, so that electromagnetic interference suppressing performance becomes deteriorated. This setback can be seen as well when the rod-shaped gasket 5 is attached to the circuit board 3 and the heat sink 4 by using double-sided adhesive tape.

SUMMARY

The present invention provides a structure to use a gasket plate made of metal sheet instead of the conventional rod-shaped gasket, and to provide a structure of a projector engine section which can prevent deterioration of electromagnetic interference suppressing performance by taking measures to prevent a gasket plate from being dislocated or falling off the space between the circuit board and the heat sink.

The present invention also provides a structure of a projector engine section which can reduce cost, since the conventional rod-shaped gasket is expensive.

According to a first aspect, there is provided a structure of a projector engine section includes: an engine section that projects through a projector lens an optical image formed by modulating a light flux depending on image information; a circuit board that has a digital mirror device control circuit and attached to the engine section; a heat sink that faces the circuit board so as to prevent a heat generation due to the fullness of heat in the engine section; a gasket plate that is made of a sheet metal and is inserted into the space between the circuit board and the heat sink, such that the gasket plate elastically contacts with a ground pattern of the circuit board and the heat sink; and a plate-shaped attaching part that is connected to the gasket plate, and is inserted and fixed between a casing frame that prevents a leakage of light by sealing the engine section and a cover that is attached to the casing frame, wherein the gasket plate is formed in a substantially U-lettered shape by having: a first contact piece that elastically contacts with a ground pattern of the circuit board; a second contact piece that elastically contacts with the heat sink; and a connecting piece which connects the first contact piece and the second contact piece, and wherein the connecting piece of the gasket plate, serving as a leading tip, is pressed into the space between the circuit board and the heat sink, wherein the gasket plate is formed in a comb-teeth shape by dividing the second contact piece into a plurality of contact piece components, and wherein the attaching part is connected to the gasket plate through a portal plate piece, which overpasses an end-edge portion of the circuit board.

According to a second aspect, there is provided a structure of a projector engine section including: an engine section that projects through a projector lens an optical image formed by modulating a light flux depending on image information; a circuit board that has a digital mirror device control circuit and attached to the engine section; a heat sink that faces the circuit board so as to prevent a heat generation due to the fullness of heat in the engine section; and a gasket plate that is made of a sheet metal and is inserted into the space between the circuit board and the heat sink, such that the gasket plate elastically contacts with a ground pattern of the circuit board and the heat sink.

BRIEF DESCRIPTION OF THE DRAWINGS

In the accompanying drawings:

FIG. 3 is a perspective view schematically showing a member made of sheet metal having a gasket plate or the like;

DETAILED DESCRIPTION

Figure 1:
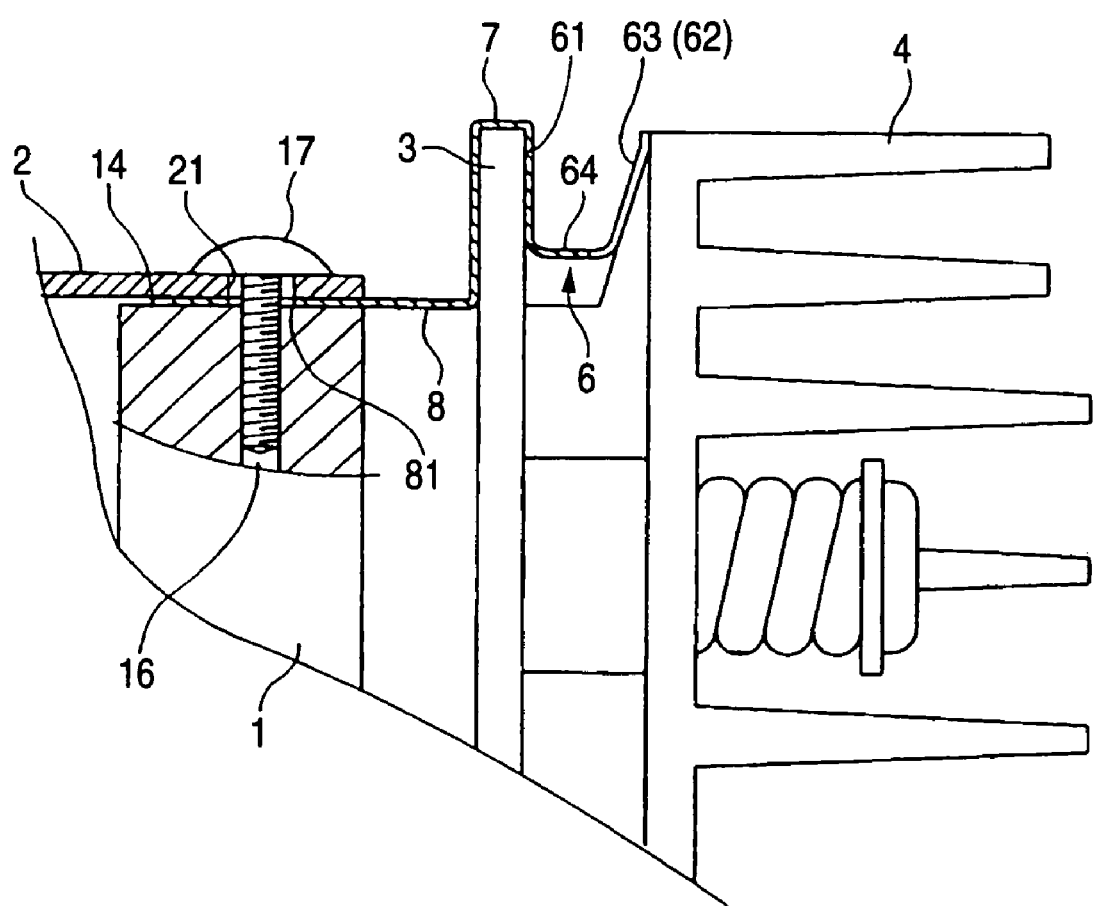
FIG. 1 is a cross-sectional view showing the essential parts of a projector engine section according to an embodiment.
Figure 2:
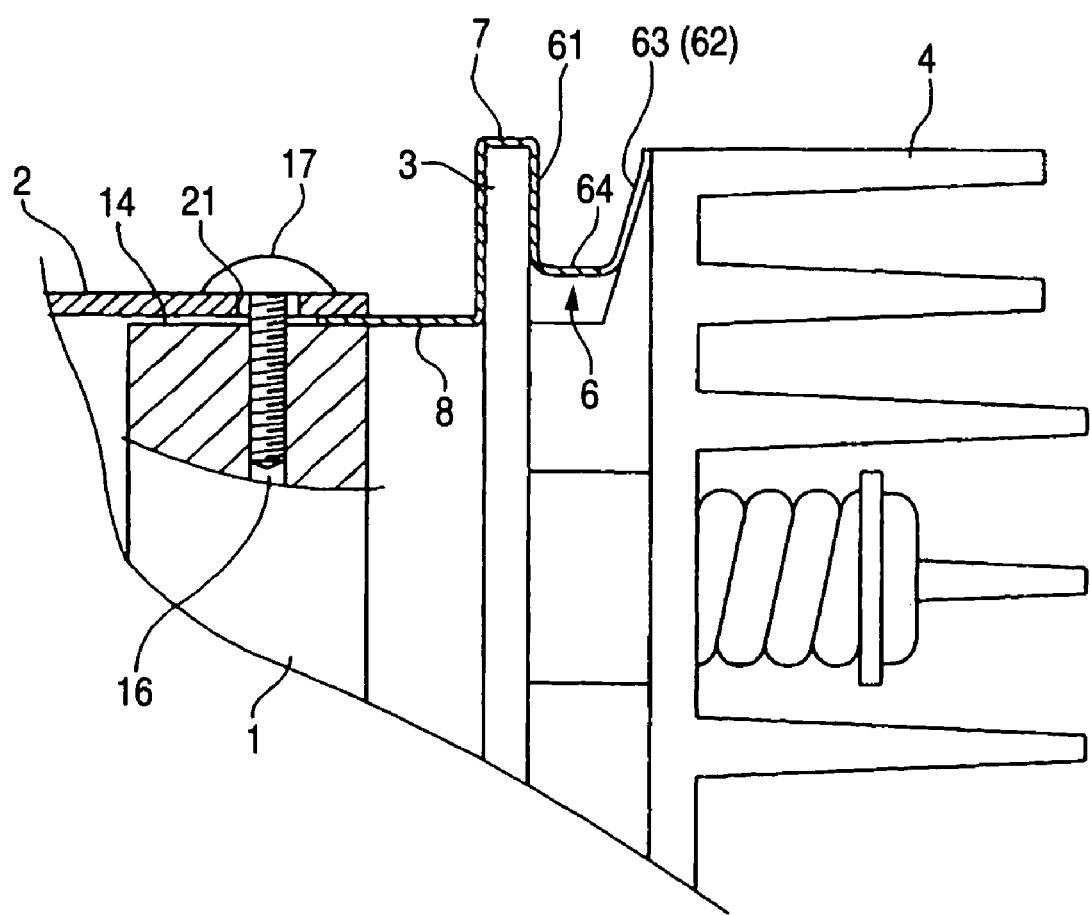
FIG. 2 is a cross-sectional view showing the essential parts of the projector engine section according to a modified embodiment.
Figure 3:
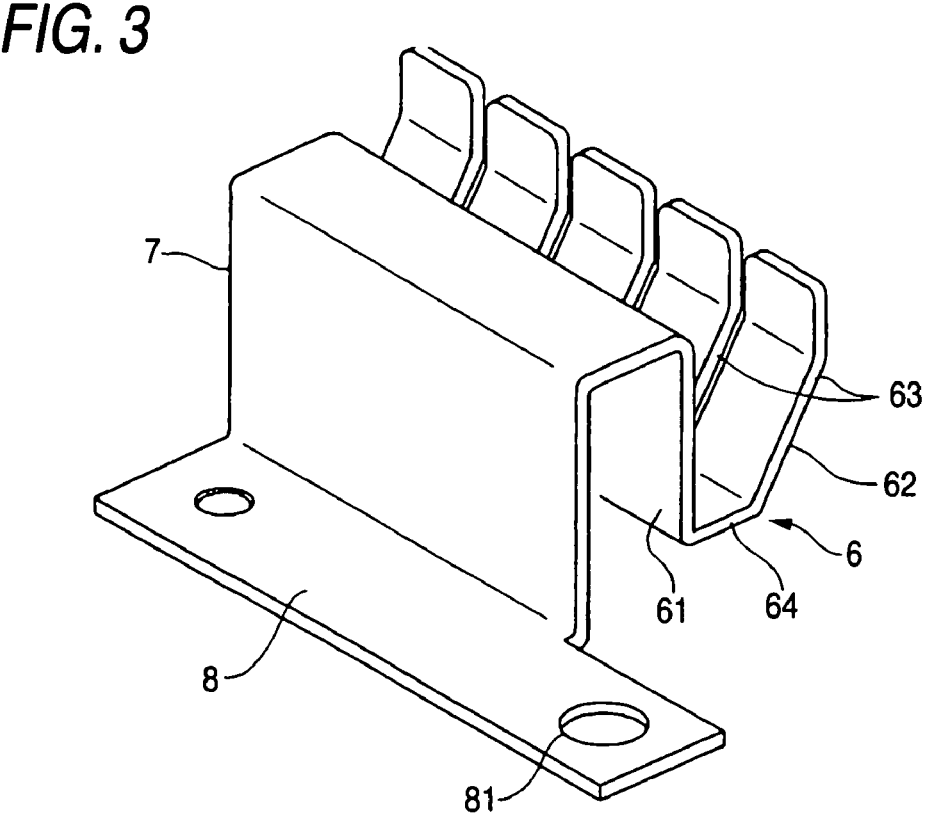

FIG. 1 is a cross-sectional view showing the essential parts of a projector engine section according to an embodiment. FIG. 2 is a cross-sectional view showing the essential parts of the projector engine section according to a modified embodiment. FIG. 3 is a perspective view schematically showing a member made of sheet metal having a gasket plate or the like.

Figure 4:
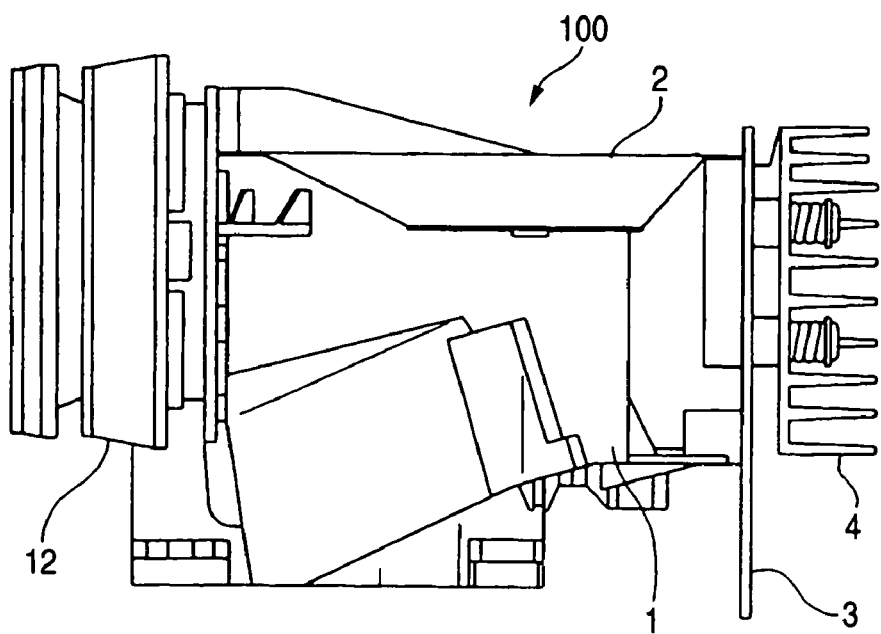
FIG. 4 is a side view schematically showing an external constitution of the projector engine.
Figure 5:
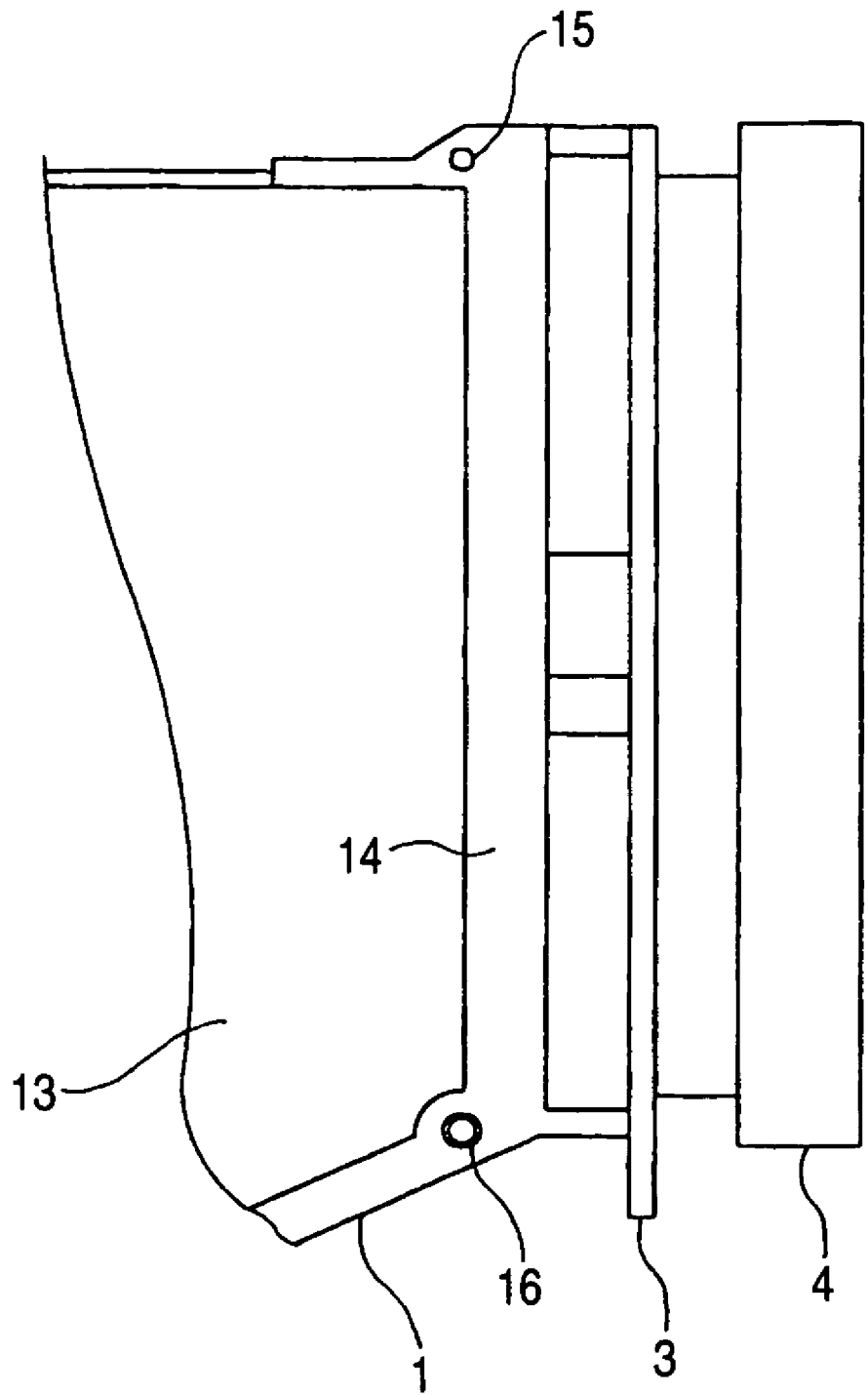
FIG. 5 is a plan view schematically showing the arrangement of a casing frame of an engine section, a circuit board, and a heat sink.

An engine section shown in FIG. 1 or FIG. 2 corresponds to an engine section 100 which was described with reference to FIG. 4. Therefore, an upper portion of a casing frame 1 is open, a mouth edge portion 14 of an aperture 13 is provided with a projection 15 and a screw hole 16 on the right and left side thereof (see FIG. 5). A cover 2 shown in FIG. 4 is attached on the mouth edge portion 14 by using the projection 15 and the screw hole 16. More specifically, a tip of the cover 2 having a screw inserting hole 21 is superimposed on the mouth edge portion 14 of the casing frame 1, the cover 2 is combined with the casing frame 1 by tightly screwing an attaching screw 17 that is inserted through the screw inserting hole 21 of the cover 2 into a screw hole 16 of the mouth edge portion 14. The cover 2 made of sheet metal disposed in an upper portion of the casing frame 1 constitutes a hollow housing, various kinds of optical parts are built in the housing, and the circuit board 3 having a digital mirror device control circuit attached thereon and the heat sink 4 are disposed in this order behind the housing. An optical image formed as the engine section 100 modulates light flux according to image information is projected through a projector lens. Heat generation to the fullness of heat in the engine section is prevented by exoergic properties of the heat sink 4.

Figure 6:
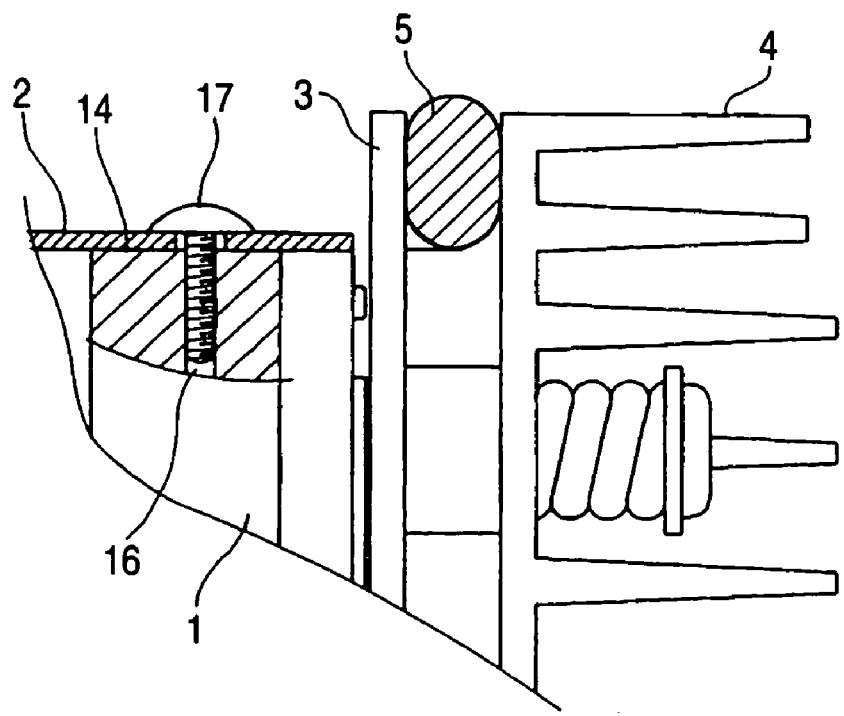
FIG. 6 is a cross-sectional view showing a conventional EMI-prevention.
Figure 7:
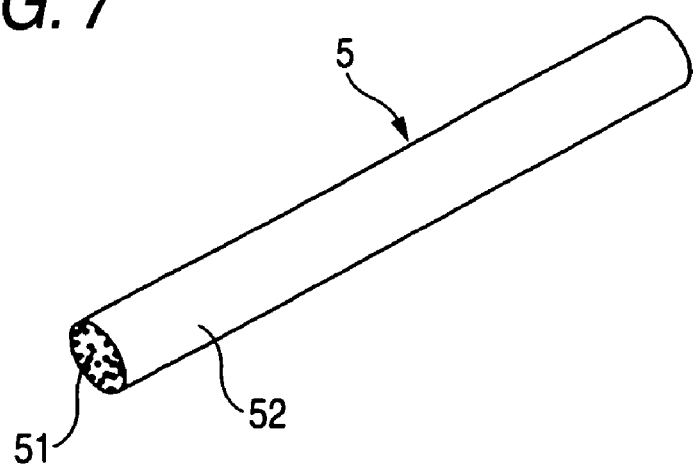
FIG. 7 is a perspective view schematically showing a rod-shaped gasket for the use in an EMI-prevention according to the related art.

Instead of a rod-shaped gasket 5 described with reference to FIG. 6 or FIG. 7, a gasket plate 6 is used because of EMI-prevention in this embodiment. As shown in FIG. 3, the U-shaped gasket plate 6 is formed by a first contact piece 61, a second contact piece 62, and a connecting piece 64. The first contact piece 61 is a plate that is transversely elongated, the second contact piece 62 is divided into a plurality of contact piece elements 63 that is formed in a comb-teeth shape, and the connecting piece 64 connects the first contact piece 61 and the second contact piece 62. The gasket plate 6 is connected to a plate-shaped attaching part 8 through a portal plate piece 7.

In FIGS. 1 and 2, the gasket plate 6 is inserted into a space between the circuit board 3 and the heat sink 4 opposite to each other. The first contact piece 61 is elastically in contact with a ground pattern (not shown) of the circuit board 3, and the respective contact piece elements 63 of the second contact piece 62 are elastically in contact with the heat sink 4. The portal plate piece 7 is disposed so as to climb over an end edge part of the circuit board 3, and the attaching part 8 is inserted between the mouth edge portion 14 of the casing frame 1 and a tip of the cover 2 which is fixed by threading on the mouth edge portion 14 of the casing frame 1. Here, in FIG. 1, a screw inserting hole 81 is formed in the attaching part 8, the attaching screw 17 which combines the cover 2 with the casing frame 1 is inserted through the screw inserting hole 81, so that the attaching part 8 is fastened by the attaching screw 17. On the other hand, in FIG. 2, the attaching part 8 is simply inserted between the mouth edge portion 14 of the casing frame 1 and the tip of the cover 2 which is fixed by threading on the mouth edge portion 14 of the casing frame 1.

The above-described gasket plate 6, the portal plate piece 7, and the attaching part 8 are formed of an integrated member made of sheet metal that is subjected to bending or punching process. It is assured that such an integrated member made of sheet metal provides functions satisfying requirement for an EMI-prevention product as much as the rod-shaped gasket 5 functions as the EMI prevention product that was described with reference to FIG. 7.

Since the attaching part 8 that is integrated to the gasket plate 6 is inserted between the mouth edge portion 14 of the casing frame 1 and the tip of the cover 2 which is fixed by threading on the mouth edge portion 14 of the casing frame 1, the gasket plate 6 is kept from being easily dislocated and falling off the space between the circuit board 3 and the heat sink 4. As a result, deterioration of electromagnetic interference suppressing performance due to dislocation and falling off of the plate 6 is prevented in advance.

Next, an example of the attaching order of the member made of sheet metal having the gasket plate 6 will be described. Before the process of attaching the cover 2 on the casing frame 1, the end edge part of the circuit board 3 is fit in the portal plate piece 7 made of sheet metal, and the gasket plate 6 is inserted into the space between the circuit board 3 and the head sink 4 while being deformed against its resilience with the connecting piece 64 as a leading tip, and the attaching part 8 is superimposed on the mouth edge portion 14 of the aperture of the casing frame 1. Then, the tip of the cover 2 is superimposed on the attaching part 8, and the attaching screw 17 is screwed into the screw hole 16 of the casing frame 1 through the screw inserting hole 21 of the cover 2 so as to be fastened. In this way, when the gasket plate 6 is pressed into the space between the circuit board 3 and the head sink 4 while the connecting piece 64 is serving as the leading tip, the gasket plate 6 the gasket plate 6 can be easily inserted into the space between the circuit board 3 and the head sink 4. Further, the first contact piece 61 of the gasket plate 6 is reliably in elastic contact with the ground pattern of the circuit board 3 by the inserting process, and the respective contact elements 63 of the second contact part 62 are reliably in elastic contact with the heat sink 4.

In the embodiment, as shown in FIG. 1, the attaching screw 17 does not only fix by threading fix the cover 2 to the casing frame 1, but also serves as a means for fixing by threading the attaching part 8 that is integrated to the gasket plate 6 to the casing frame 1. Therefore, an additional screw is unnecessary to fix the attaching part 8 to the casing frame 1. For this reason, it is possible to attaching the gasket plate 6 without raising the cost due to an increase of parts.

Figure 8:
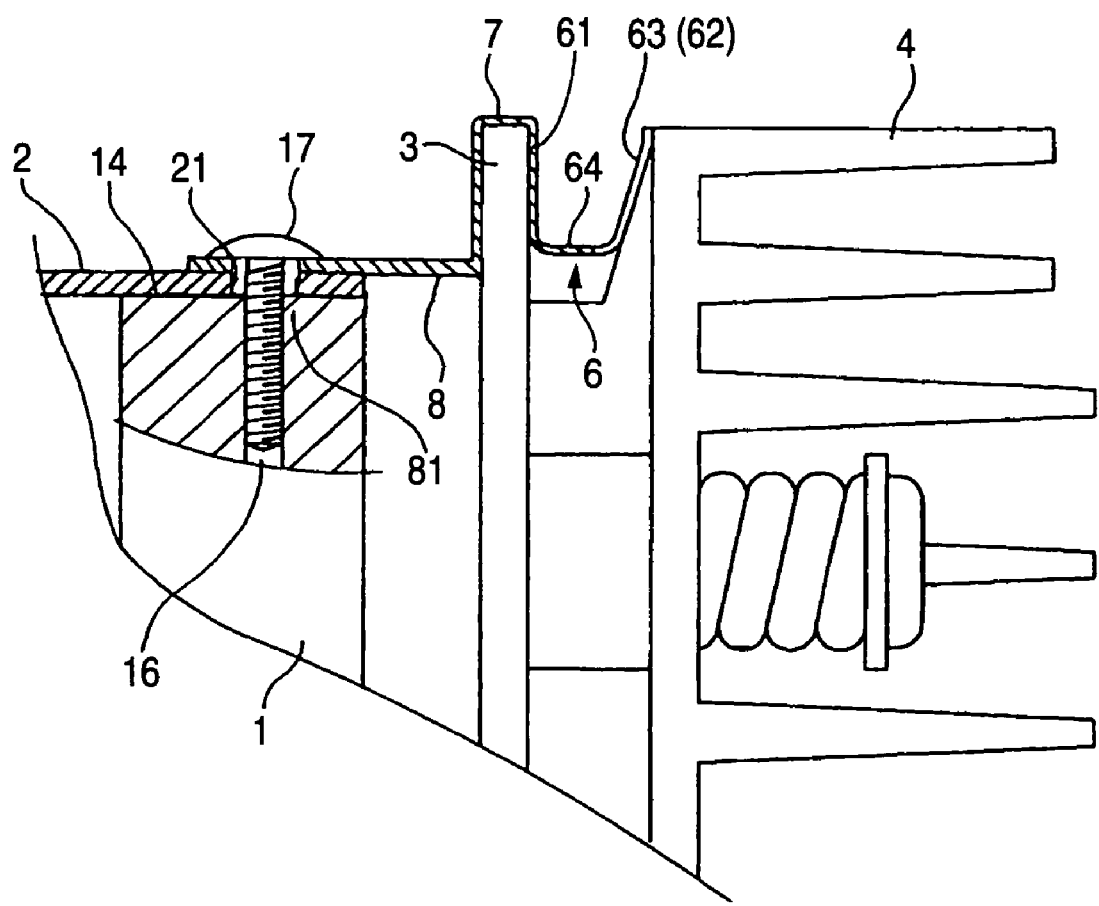
FIG. 8 is a cross-sectional view showing the essential parts of the projector engine section according a first modification.
Figure 9:
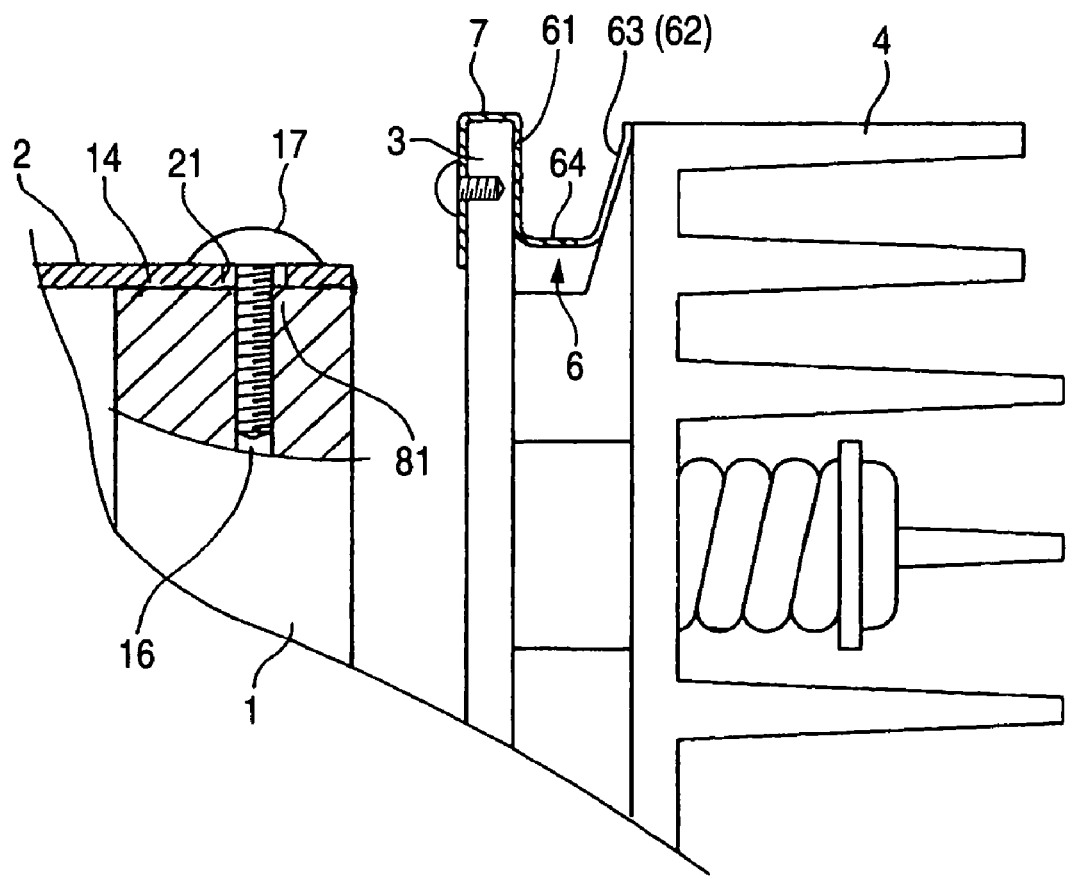
FIG. 9 is a cross-sectional view showing the essential parts of the projector engine section according a second modification.

The gasket plate 6 may be attached to the casing frame 1 by inserting the attaching part 8 between the cover 2 and the head portion of the attaching screw 17, as shown in FIG. 8. Thee gasket plate 6 may be configured by omitting the attaching part 8 and attached to the circuit board 3 as shown in FIG. 9.

As described in detail with reference to the embodiments, according to a first aspect of the invention, there is provided a structure of a projector engine section including: an engine section that projects through a projector lens an optical image formed by modulating a light flux depending on image information; a circuit board that has a digital mirror device control circuit and attached to the engine section; a heat sink that faces the circuit board so as to prevent a heat generation due to the fullness of heat in the engine section; and a gasket plate that is made of a sheet metal and is inserted into the space between the circuit board and the heat sink, such that the gasket plate elastically contacts with a ground pattern of the circuit board and the heat sink.

According to this structure, the gasket plate made of metal sheet used instead of the rod-shaped gasket provides functions satisfying requirement for an EMI-prevention product. Moreover, since the plate-shaped attaching part that is connected to the gasket plate is inserted and fixed between the casing frame and the cover, the gasket plate is secured to the space between the circuit board and the heat sink. As a result, deterioration of electromagnetic interference suppressing performance is prevented in advance. In addition, since the gasket plate is made of metal sheet, and the attaching part is formed in a plate shape, the gasket plate and the attaching part are formed of an integrated metal sheet, which makes it possible to easily lower the cost. Therefore, it is possible to reduce the cost of the structure of the projector engine section.

The structure of the projector engine section may further includes a plate-shaped attaching part that is connected to the gasket plate, and is inserted and fixed between a casing frame that prevents a leakage of light by sealing the engine section and a cover that is attached to the casing frame.

According to the configuration, the U-shaped gasket plate integrally including a first contact piece that elastically contacts with a ground pattern of the circuit board, a second contact piece that elastically contacts with the heat sink, and a connecting piece that connects the first contact piece and the second contact piece is inserted into the space between the circuit board and the heat sink, the connecting piece of the gasket plate serving as a leading tip. Here, the leading tip means a tip that is first inserted into the space between the circuit board and the heat sink while the gasket plate is being inserted into the space during assembling. With this structure, since the gasket plate can be pressed into the space between the circuit board and the head sink while being deformed against its resilience with the connecting piece as the leading tip, the gasket plate can be easily inserted into the space between the circuit board and the head sink. Further, the first contact piece of the gasket plate is reliably in elastic contact with the ground pattern of the circuit board by the inserting process, and the second contact part are reliably in elastic contact with the heat sink, and thus the gasket plate provides functions satisfying requirement for an EMI-prevention product.

In the structure of the projector engine section, there may be configured that the gasket plate is formed in a substantially U-lettered shape by having: a first contact piece that elastically contacts with a ground pattern of the circuit board; a second contact piece that elastically contacts with the heat sink; and a connecting piece which connects the first contact piece and the second contact piece, and that the connecting piece of the gasket plate, serving as a leading tip, is pressed into the space between the circuit board and the heat sink. The gasket plate may be formed in a comb-teeth shape by dividing the second contact piece into a plurality of contact piece components. According to this configuration, since the plurality of contact piece components of the second contact piece is individually in contact with the heat sink, the contact reliability improves, which ensures a stable electromagnetic interference suppressing performance. In addition, better workability is found in the gasket plate that is inserted into the space between the circuit board and heat sink, with the connecting piece as a leading tip, compared to a case in which the second contact piece is not divided into a plurality of contact piece components.

In the structure of the projector engine section, there may be configured that the attaching part is connected to the gasket plate through a portal plate piece, which overpasses an end-edge portion of the circuit board. According to the configuration, it is possible to easily insert the gasket plate in the space between the circuit board and the heat sink.

According to a second aspect of the invention, there is provided a structure of a projector engine section including: an engine section that projects through a projector lens an optical image formed by modulating a light flux depending on image information; a circuit board that has a digital mirror device control circuit and attached to the engine section; a heat sink that faces the circuit board so as to prevent a heat generation due to the fullness of heat in the engine section; a gasket plate that is made of a sheet metal and is inserted into the space between the circuit board and the heat sink, such that the gasket plate elastically contacts with a ground pattern of the circuit board and the heat sink; and a plate-shaped attaching part that is connected to the gasket plate, and is inserted and fixed between a casing frame that prevents a leakage of light by sealing the engine section and a cover that is attached to the casing frame, wherein the gasket plate is formed in a substantially U-lettered shape by having: a first contact piece that elastically contacts with a ground pattern of the circuit board; a second contact piece that elastically contacts with the heat sink; and a connecting piece which connects the first contact piece and the second contact piece, and wherein the connecting piece of the gasket plate, serving as a leading tip, is pressed into the space between the circuit board and the heat sink, wherein the gasket plate is formed in a comb-teeth shape by dividing the second contact piece into a plurality of contact piece components, and wherein the attaching part is connected to the gasket plate through a portal plate piece, which overpasses an end-edge portion of the circuit board.

According to the aspects of the invention, the EMI-prevention is taken by using a cost effective gasket plate made of metal sheet instead of using the conventional rod-shaped gasket, and the gasket plate is fastened to the casing frame through the attaching part. Therefore, the gasket plate is kept from being easily dislocated and falling off the space between the circuit board and the heat sink opposite to each other. As a result, deterioration of electromagnetic interference suppressing performance can be prevented, so that reliability can be improved. For this reason, it is possible to improve quality of an image projected by a projector.

Further, since the U-shaped gasket plate is formed and thus better workability is found while the gasket plate is being assembled into the space between the circuit board and heat sink, the invention is advantageous to mass production, compared to assembling the conventional rod-shaped gasket.

Although the present invention has been shown and described with reference to the embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A structure of a projector engine section comprising:
    an engine section that projects through a projector lens an optical image formed by modulating a light flux depending on image information;
    a circuit board that has a digital mirror device control circuit and attached to the engine section;
    a heat sink that faces the circuit board so as to prevent a heat generation due to the fullness of heat in the engine section;
    a gasket plate that is made of a sheet metal and is inserted into the space between the circuit board and the heat sink, such that the gasket plate elastically contacts with a ground pattern of the circuit board and the heat sink; and
    a plate-shaped attaching part that is connected to the gasket plate, and is inserted and fixed between a casing frame that prevents a leakage of light by sealing the engine section and a cover that is attached to the casing frame,
    wherein the gasket plate is formed in a substantially U-lettered shape by having: a first contact piece that elastically contacts with a ground pattern of the circuit board; a second contact piece that elastically contacts with the heat sink; and a connecting piece which connects the first contact piece and the second contact piece, and
    wherein the connecting piece of the gasket plate, serving as a leading tip, is pressed into the space between the circuit board and the heat sink,
    wherein the gasket plate is formed in a comb-teeth shape by dividing the second contact piece into a plurality of contact piece components, and
    wherein the attaching part is connected to the gasket plate through a portal plate piece, which overpasses an end-edge portion of the circuit board.

2. A structure of a projector engine section comprising:
    an engine section that projects through a projector lens an optical image formed by modulating a light flux depending on image information;
    a circuit board that has a digital mirror device control circuit and attached to the engine section;
    a heat sink that faces the circuit board so as to prevent a heat generation due to the fullness of heat in the engine section; and
    a gasket plate that is made of a sheet metal and is inserted into the space between the circuit board and the heat sink, such that the gasket plate elastically contacts with a ground pattern of the circuit board and the heat sink.

3. The structure of the projector engine section according to claim 2, further comprising a plate-shaped attaching part that is connected to the gasket plate, and is inserted and fixed between a casing frame that prevents a leakage of light by sealing the engine section and a cover that is attached to the casing frame.

4. The structure of the projector engine section according to claim 3, wherein the gasket plate is formed in a substantially U-lettered shape by having: a first contact piece that elastically contacts with a ground pattern of the circuit board; a second contact piece that elastically contacts with the heat sink; and a connecting piece which connects the first contact piece and the second contact piece, and
    wherein the connecting piece of the gasket plate, serving as a leading tip, is pressed into the space between the circuit board and the heat sink.

5. The structure of the projector engine section according to claim 4, wherein the gasket plate is formed in a comb-teeth shape by dividing the second contact piece into a plurality of contact piece components.

6. The structure of the projector engine section according to claims 3, wherein the attaching part is connected to the gasket plate through a portal plate piece, which overpasses an end-edge portion of the circuit board.

* * * * *